(12) United States Patent
Hagerman et al.

(10) Patent No.: US 9,426,712 B2
(45) Date of Patent: Aug. 23, 2016

(54) ADVANCED HANDOVER FOR ADAPTIVE ANTENNAS

(75) Inventors: Bo Hagerman, Tyresö (SE); Bo Göransson, Sollentuna (SE); Davide Imbeni, Modena (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 2144 days.

(21) Appl. No.: 12/282,718

(22) PCT Filed: Aug. 30, 2006

(86) PCT No.: PCT/SE2006/000994
§ 371 (c)(1),
(2), (4) Date: Dec. 19, 2008

(87) PCT Pub. No.: WO2007/105999
PCT Pub. Date: Sep. 20, 2007

(65) Prior Publication Data
US 2009/0298502 A1     Dec. 3, 2009

Related U.S. Application Data

(60) Provisional application No. 60/781,368, filed on Mar. 13, 2006.

(51) Int. Cl.
*H04W 36/30* (2009.01)
*H04W 16/28* (2009.01)

(52) U.S. Cl.
CPC .............. *H04W 36/30* (2013.01); *H04W 16/28* (2013.01)

(58) Field of Classification Search
USPC .................... 370/331, 332, 333, 334
See application file for complete search history.

(56) References Cited

U.S. PATENT DOCUMENTS 5,787,147 A * 7/1998 Gundersen ................. 379/10.03
5,966,094 A * 10/1999 Ward et al. ................. 342/373

(Continued)

FOREIGN PATENT DOCUMENTS

EP    1 341 315 A1    9/2003
JP    H10-126831 A    5/1998

(Continued)

OTHER PUBLICATIONS

3GPP. 3rd Generation Partnership Project; Technical Specification Group Radio Access Network; Physical layer—Measurements (FDD) (Release 5) 3GPP TS 25.215 V5.7.0 (Jun. 2005).

*Primary Examiner* — Mohammad Anwar

(57) ABSTRACT

Handover is a main function that is used to support mobility in the network. In a cellular communication network having adaptive antennas for enabling narrow beam operation, it is assumed that a mobile unit is served by an active cell set (S1). A basic idea according to the present invention is to select, prior to establishment of a new serving radio link for a mobile unit, a narrow target beam within a neighbor area of the current active cell set of the mobile unit based on pre-established information of narrow beams within the neighbor area (S2), and to initiate establishment of the new serving radio link directly with the selected narrow target beam (S3). In this way, the narrow target beam can be selected at handover initiation and the new radio link can be established directly with a target narrow beam without first establishing the radio link with a cell-wide beam and then, after uplink measurements, reconfiguring the radio link onto a narrow beam.

29 Claims, 11 Drawing Sheets

(56) References Cited

U.S. PATENT DOCUMENTS

| | | | |
|---|---|---|---|
| 6,118,767 A * | 9/2000 | Shen et al. | 370/252 |
| 6,377,806 B1 * | 4/2002 | Tokuyoshi | 455/437 |
| 6,571,097 B1 | 5/2003 | Kenichi | |
| 6,580,910 B1 * | 6/2003 | Mazur et al. | 455/440 |
| 6,701,165 B1 * | 3/2004 | Ho et al. | 455/562.1 |
| 6,847,832 B2 * | 1/2005 | Wong et al. | 455/562.1 |
| 6,885,866 B1 * | 4/2005 | Wikstedt et al. | 455/436 |
| 2005/0070285 A1 | 3/2005 | Goransson | |
| 2005/0070331 A1 | 3/2005 | Kenichi et al. | |
| 2005/0202859 A1 | 9/2005 | Johnson et al. | |
| 2006/0286974 A1 * | 12/2006 | Gore et al. | 455/422.1 |

FOREIGN PATENT DOCUMENTS

| | | |
|---|---|---|
| JP | 2004-297750 A | 10/2004 |
| WO | WO 99/02005 A1 | 1/1999 |
| WO | WO 99/33304 A1 | 7/1999 |
| WO | WO 00/05826 A1 | 2/2000 |
| WO | WO 00/51368 A2 | 8/2000 |
| WO | WO 01/39524 A2 | 5/2001 |
| WO | WO 2005/065171 A2 | 7/2005 |
| WO | WO 2006/004463 A1 | 1/2006 |

* cited by examiner

ADVANCED HANDOVER FOR ADAPTIVE ANTENNAS

This application claims the benefit of U.S. Provisional Application No. 60/781,368, filed Mar. 13, 2006, the disclosure of which is fully incorporated herein by reference.

TECHNICAL FIELD

The present invention generally relates to wireless or cellular communication and more particularly to handover for adaptive antennas.

BACKGROUND

The use of adaptive or smart antennas is considered as one of the key features for increasing coverage and capacity of a wireless system such as WCDMA. When beamforming is applied in the base station several narrow beams, compared to the sector/cell beam, may be created to maintain coverage in the cell. FIG. 1A illustrates a sector cell antenna beam. Although a sector antenna is useful to communicate broadcast and/or control information to all mobiles in the sector cell, an adaptive antenna may be used to transmit and receive in narrow beams covering just a part of the sector cell. FIG. 1B shows an example of a narrow antenna beam. FIG. 2 illustrates an example of a cellular network with a base station transmitting a sector beam, a base station transmitting one of the possible beams in a multi-beam system, and a base station transmitting a steerable beam. Some benefits of adaptive antennas are shown in FIG. 3, where a narrow beam of the adaptive antenna may be directed to an intended mobile and therefore spreads less interference in the download or downlink direction. The narrow beam also suppresses spatial interference from adjacent cell interferers in the uplink direction. Both factors increase the signal-to-interference gain, and therefore increase the overall system performance. Currently there exist no commercial installations of adaptive antennas in the field of WCDMA systems.

Another fundamental feature in a cellular network is handover (HO). Handover is a main function that is used to support mobility in the network. When a user is moving in the cellular network, it has to change serving cell when the signal from the current cell is too weak to support the current radio link. Also, in e.g. WCDMA there is a soft handover (SHO) functionality. This means that there may exist several radio links between the user terminal and the network. This has the effect that the combination of several radio links may together provide sufficient quality of the combined radio link set.

When narrow beams are created by the smart antenna system, the user equipment (UE) needs to make a handover between the different beams in order to maintain the call. In order to make these handovers, a reference (or pilot) signal measurement is used to decide upon the quality of a specific base station antenna beam.

However, when adaptive antennas and handover are combined in wireless networks such as WCDMA networks certain problem arises. In many systems, e.g. WCDMA, a common pilot signal is used as a reference for the handover measurements. This reference should be transmitted in the whole cell (defining the cell coverage), as specified by 3GPP standards. Hence the reference is common for an entire cell and may thus constitute a poor reference for the quality in specific beams when beamforming is applied. Furthermore, when performing a handover, the narrow beams of the adjacent cells are not known to the mobile, hence the handover needs to be carried out on sector covering wide beams.

In reference [1], downlink quality measurements associated with a broadcast signal transmission from neighboring base stations are detected by the mobile and reported to the radio network. First, a target base station is determined based on the measurements, and a radio link is established between the target base station and the mobile using the cell-wide broadcast signal. Subsequently, a desired antenna beam is determined using uplink measurements, and the radio link is then re-configured to the desired antenna beam. This means that after establishing a radio link, the link needs to be re-configured onto a narrow beam. When a new handover should be performed, each radio link must first be re-configured to a sector-wide beam again. This process will not only consume resources in the network for signaling, but will also lower the capacity since some radio links are transmitted over a wide sector beam instead of a high gain narrow beam.

There is thus a general need to improve the handover function in wireless systems when adaptive antennas and/or beamforming is applied.

SUMMARY

The present invention overcomes these and other drawbacks of the prior art arrangements.

It is a general object of the present invention to improve handover in wireless cellular systems using adaptive antennas for beamforming.

It is an object to improve the possibility to secure and more fully exploit the system capacity/coverage potential offered by narrow beam/adaptive antenna techniques.

In particular it is desirable to facilitate the handover function to allow for direct handover from/to narrow beams, and narrow beam to narrow beam without the need to back off and transmit over the entire cell at handover.

Briefly, the problem when adaptive antenna (AA) technology is deployed is that the common reference signal specified by standards covers the whole cell, while the beam pattern formed by the AA system will cover parts of the cell only.

A basic idea according to the present invention is to select, prior to establishment of a new serving radio link for a mobile unit, a narrow target beam within a neighbor area of the current active cell set of the mobile unit based on pre-established information of narrow beams within the neighbor area, and to initiate establishment of the new serving radio link directly with the selected narrow target beam.

In this way, the narrow target beam can be selected at handover initiation and the new radio link can be established directly with a target narrow beam (also referred to as a sub-cell beam, or cell portion beam) without first establishing the radio link with a cell-wide beam and then, after uplink measurements, reconfiguring the radio link onto a narrow beam.

The active cell set may include one or more active cells, and the neighbor area may include one or more neighbor cells.

The invention also relates to a network unit in a cellular radio communication system. The network unit preferably comprises a handover controller and an associated information structure such as a table and/or database for storing information of narrow beams within said cellular communication system. The handover controller is operable for consulting the information structure, prior to establishment of a new serving radio link for a mobile unit, to find a suitable narrow target beam within a neighbor area of the current active cell set, and for initiating establishment of the new radio link directly with the selected narrow target beam.

The invention also provides a database for supporting handover in a cellular radio communication system, where the database is configured for storing information of narrow beams within the cellular communication system and structured for associating each relevant combination of active cell set and target cell with a narrow beam to enable identification of a narrow target beam in response to information of active cell set and target cell.

The invention offers the following advantages:
Improved handover for adaptive antennas.
Improved exploration of potential system capacity/coverage gains.

Other advantages offered by the invention will be appreciated when reading the below description of embodiments of the invention.

DETAILED DESCRIPTION

For a better understanding of the invention, it may be useful to begin with a brief overview and analysis of the prior art techniques.

In WCDMA, for example, the handover measurements and signaling is always based on the Primary Common PIlot CHannel, P-CPICH, which is the basis for all measurements in the system. This signal, which is a unique sequence in each cell, is measured by all terminals in the system. It can be argued that this is the signal that defines a cell in a WCDMA system. Since this signal needs to be the same in the whole cell, certain problems arise when several narrow beams are used to cover a cell, e.g. when beamforming is applied in the system. For example, the handover mechanism is based on quality measurements on the P-CPICH. The UE is constantly measuring the quality of the pilot from neighboring cells, and this is reported to the radio network controller (RNC). The RNC then decide to add a link from a certain cell to the active set if certain requirements are fulfilled, e.g. the quality of the pilot signal is above a certain threshold. Also, when the quality of a pilot signal drop below a certain limit, this radio link is dropped. In this way, the UE can maintain a radio connection when it travels through the cellular layout of a system.

Figure 1A:
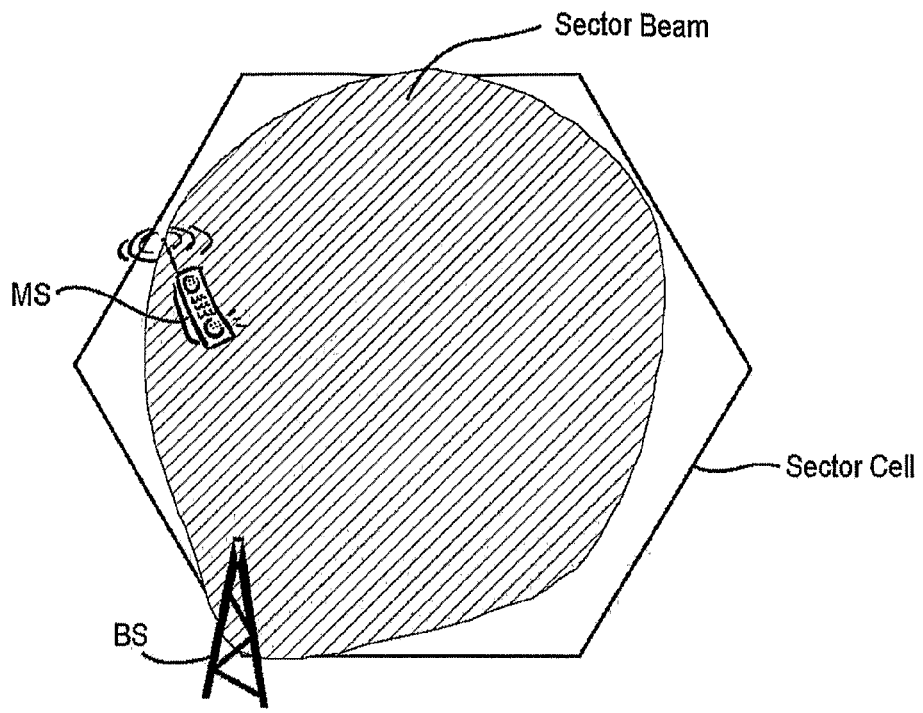
FIG. 1A illustrates a sector cell antenna beam.
Figure 1B:
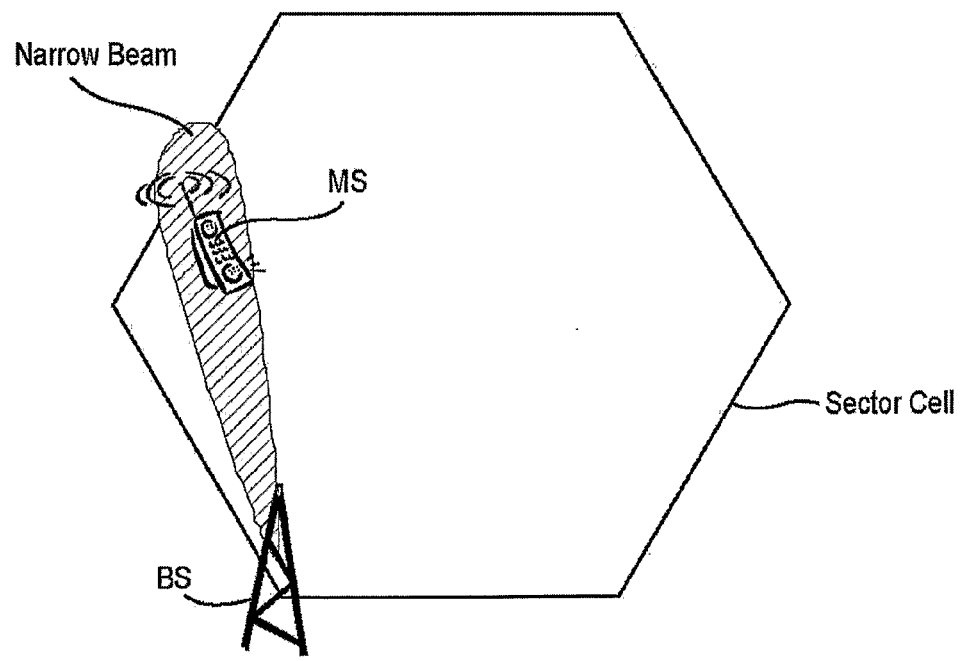
FIG. 1B shows an example of a narrow antenna beam.
Figure 2:
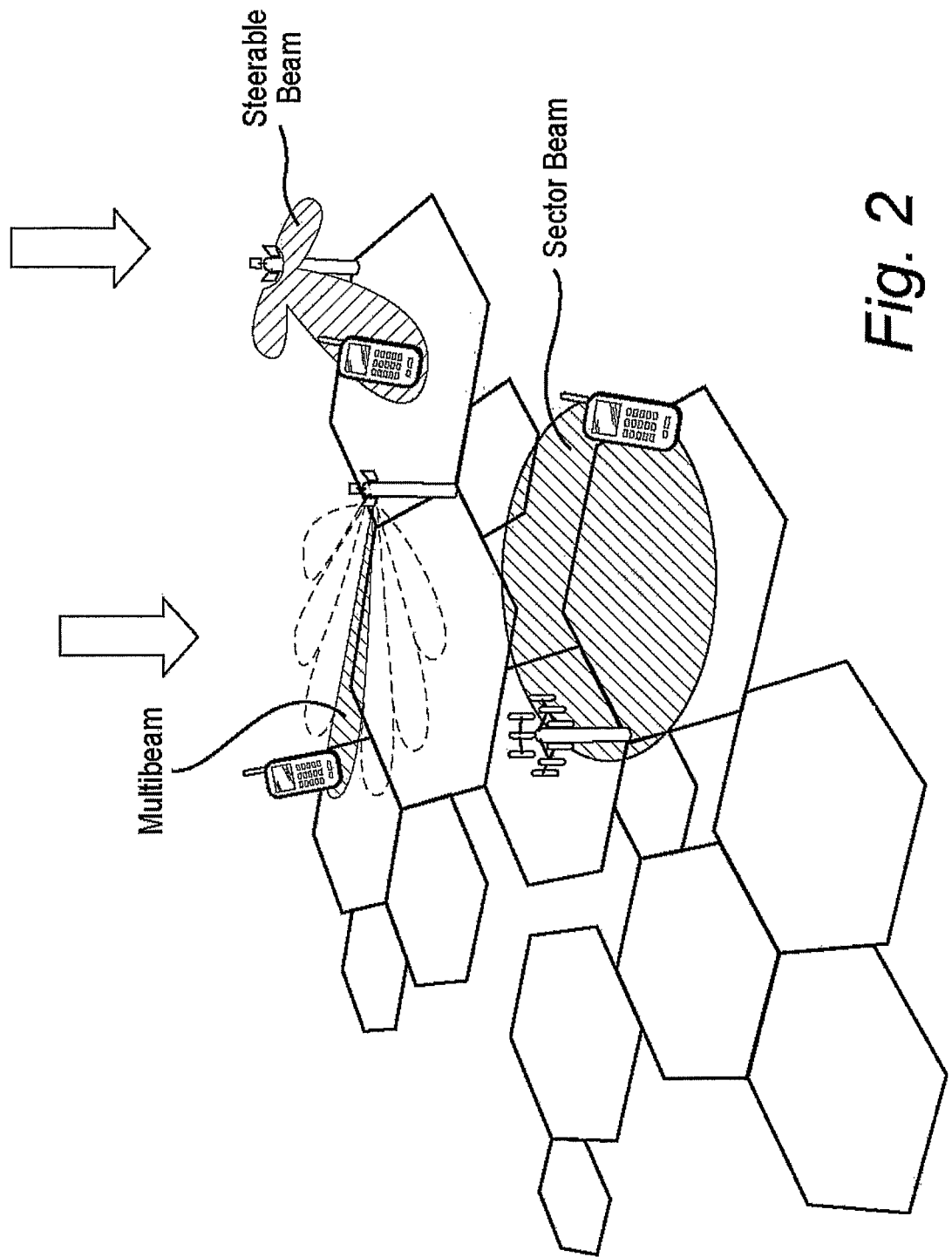
FIG. 2 illustrates an example of a cellular network with a base station transmitting a sector beam, a base station transmitting one of the possible beams in a multi-beam system, and a base station transmitting a steerable beam.
Figure 3:
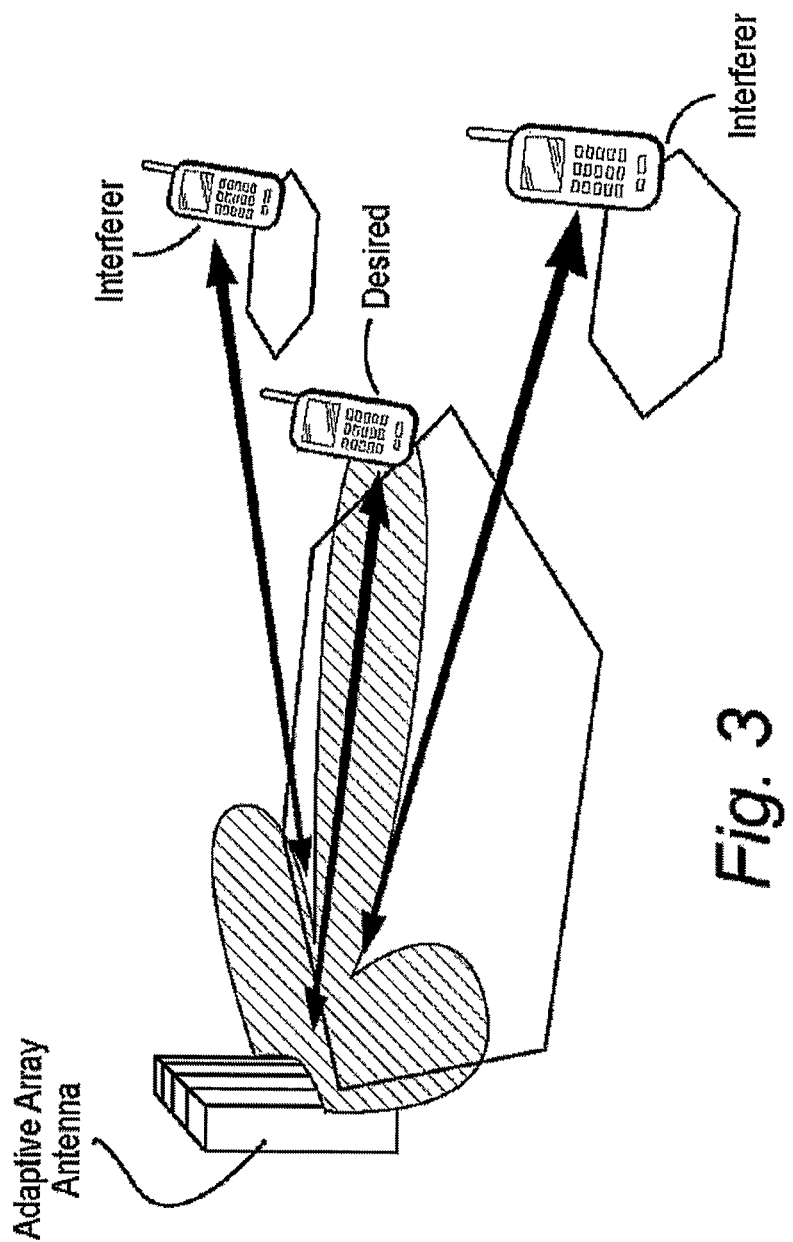
FIG. 3 illustrates how a narrow beam of an adaptive antenna may be directed to an intended mobile and therefore spreads less interference in the download or downlink direction.
Figure 4:
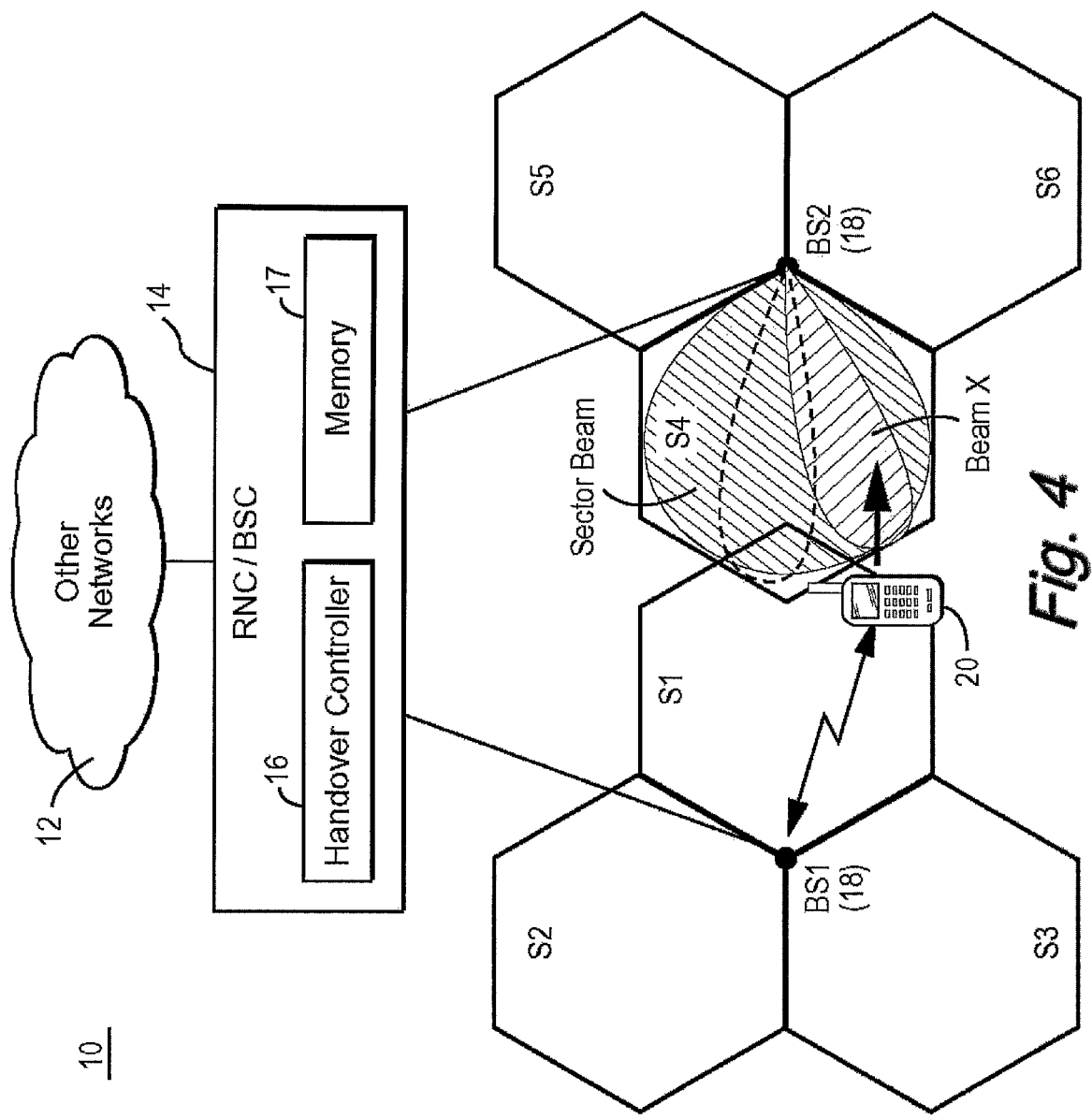
FIG. 4 illustrates an example of a radio communication system that includes a radio network controller/base station controller coupled to representative base stations.

FIG. 4 illustrates an example of a radio communication system 10 that includes a radio network controller (RNC)/base station controller (BSC) 14 coupled to representative base stations 18 (BS1 and BS2). The RNC/BSC 14 may also be coupled to one or more other networks 12. The RNC/BSC includes among other things a handover controller 16 and a memory 17 for storing, e.g. signal quality information used in handover decision making procedures. Base station BS1 divides its coverage into three representative sectors S1, S2, S3. Base station BS2 similarly divides its coverage into three representative sectors S4, S5, S6. Each sector has one or more antennas. In the example of FIG. 4, at least base station BS2 includes one or more adaptive antennas, and sector S4 includes a sector beam antenna for broadcasting common information such as a pilot signal. Other cell-wide signals may also be employed. An example of a pilot signal is the primary CPICH signal. Sector S4 may also include a multi-beam and/or steerable beam antenna such that one or more narrow beams may be directed to a particular portion of the sector cell. A mobile station 20 has an active radio link with base station BS1 and is moving toward a portion of sector S4 of base station BS2 covered by narrow antenna beam X. The movement prompts a handover to sector S4.

It has been recognized that the primary problem when beamforming is deployed in a conventional WCDMA system is how to manage the handovers. Since the mobile or UE receives the radio link through a narrow beam, the channel quality of which may be very different from the quality of a sector covering P-CPICH, the handover measurements made by the UE on the P-CPICH may not reflect the quality that the UE experiences with transmission over the narrow beam. In this case a radio link that is below the threshold when measured on the P-CPICH may be dropped even if the quality on the narrow beam is above the threshold. Another problem that arises when beamforming is used is that the prior art systems cannot handle inter/intra cell beam handovers in an efficient way. Since all handover measurements are based on the P-CPICH, the quality of each beam cannot be monitored by the UE.

This problem is alleviated to some extent for the intra cell case by measurements per user in each cell portion of a given cell as introduced in later revisions of the 3GPP standard of reference [2]. However, it is not possible to use these measurements for handover from one cell to another cell due to limitations in the 3GPP standard. In addition, since the measurements are defined to be performed by the base station on the uplink channel, they will not really tell the quality of the downlink channel.

The invention proposes an entirely different solution. A basic idea according to the present invention is to select, prior to establishment of a new serving radio link for a mobile unit, a narrow target beam within a neighbor area of the current active cell set of the mobile unit based on pre-established information of narrow beams within the neighbor area, and to initiate establishment of the new serving radio link directly with the selected narrow target beam.

In this way, the narrow target beam can be selected at handover initiation and the new radio link can be established directly with a target narrow beam (a narrow beam is also referred to as a sub-cell beam, cell portion beam or lobe) without first establishing the radio link with a cell-wide beam and then, after uplink measurements, reconfiguring the radio link onto a narrow beam.

Preferably, a target beam is selected within a neighboring target cell directly at handover initiation based on pre-established information on the radio centric environment including identification and estimation of narrow beams in the system. This information typically includes identification of narrow beams within the considered neighbor area as well as information on estimated performance of the identified narrow beams.

In a preferred exemplary embodiment of the invention, a representation of the pre-established information is stored in a table on the network side, and a table look-up is performed to find a suitable narrow target beam. Preferably, the table is built based on measurements of the radio centric environment, including identification and estimation of narrow beams, at deployment of the cellular communication system.

For example, at system deployment, the radio centric environment is measured to identify the various narrow beams of the system. A specific goal is to maintain information, e.g. in a table, of neighboring narrow beams so that the problem of handover can be reduced. This information or table is preferably maintained on the network side, e.g. in the radio network controller or an equivalent unit. By using a table of nearest, "best" neighbors, it may in fact be possible to perform direct handover between narrow beams. As indicated, it is preferable to select a narrow target beam among those narrow beams (within the considered neighbor area) that have the highest estimated performance. If desired the table may subsequently be adaptively updated after deployment based on handover experiences during run-time and/or updated at deployment changes.

This means for example that a table on the network side can be used to store information on the best estimate, and to be used for look-up of the best narrow beam transmission when allocating a new radio link at handover. It is also possible to perform a search among the narrow beams within the neighbor cells to find a suitable narrow target beam.

Figure 5:
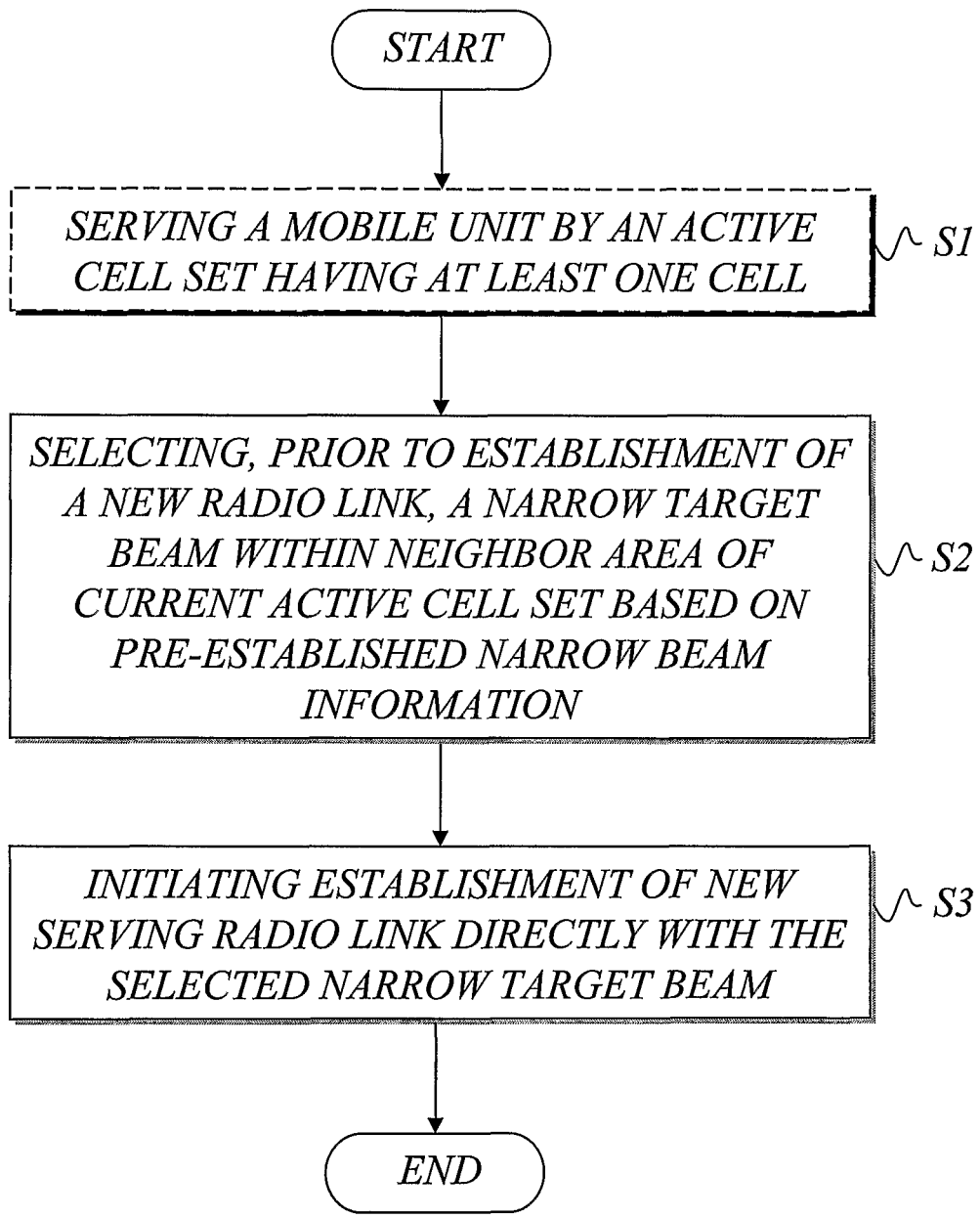
FIG. 5 is a schematic flow diagram of a preferred exemplary method for supporting handover in a cellular radio communication system having adaptive antennas for enabling narrow beam operation.

FIG. 5 is a schematic flow diagram of a preferred exemplary method for supporting handover in a cellular radio communication system having adaptive antennas for enabling narrow beam operation. As indicated in step S1, a mobile unit is served by an active cell set of at least one cell. Before establishing a new serving radio link, a narrow target beam within a neighbor area of the current active cell set is selected based on pre-established information on narrow beams within the neighbor area, as indicated in step S2. The establishment of the new serving radio link is then initiated directly with the selected narrow target beam, as indicated in step S3.

Preferably, a target cell in the considered neighbor area is selected based on quality measurements, in accordance with normal procedures, and a narrow target beam within the target cell is selected by using the pre-established narrow beam information, and more particularly information of narrow beams within the selected target cell.

In a preferred exemplary embodiment of the invention, it is suggested to use a table, database or similar information structure on the network side, such as in the RNC, to facilitate the handover function. At system deployment, the radio centric environment is measured, implying that the various beams of the system are identified and estimated, and a table of this environment is then preferably built. The idea here is to maintain a pre-established table of neighboring beams, so that the problem of handover can be diminished. As described above, one of the main problems with e.g. WCDMA is that the narrow beams of a neighboring cell are not known to the system (network or UE). Hence, a handover from one narrow beam in one cell to a narrow beam in an adjacent cell is not possible, nor is a handover to/from a narrow beam to/from a cell covering beam. But if a table or similar information structure of nearest neighbors is kept, e.g. in the RNC, as suggested by the invention, this might in fact be possible even if measurements are solely based on the P-CPICH or equivalent pilot signal.

In the following, the invention will be described with reference to the particular example of FIGS. 6-8. Although the invention will primarily be described with reference to W-CDMA systems, the invention is generally applicable to handover in cellular radio communication systems.

Figure 6:
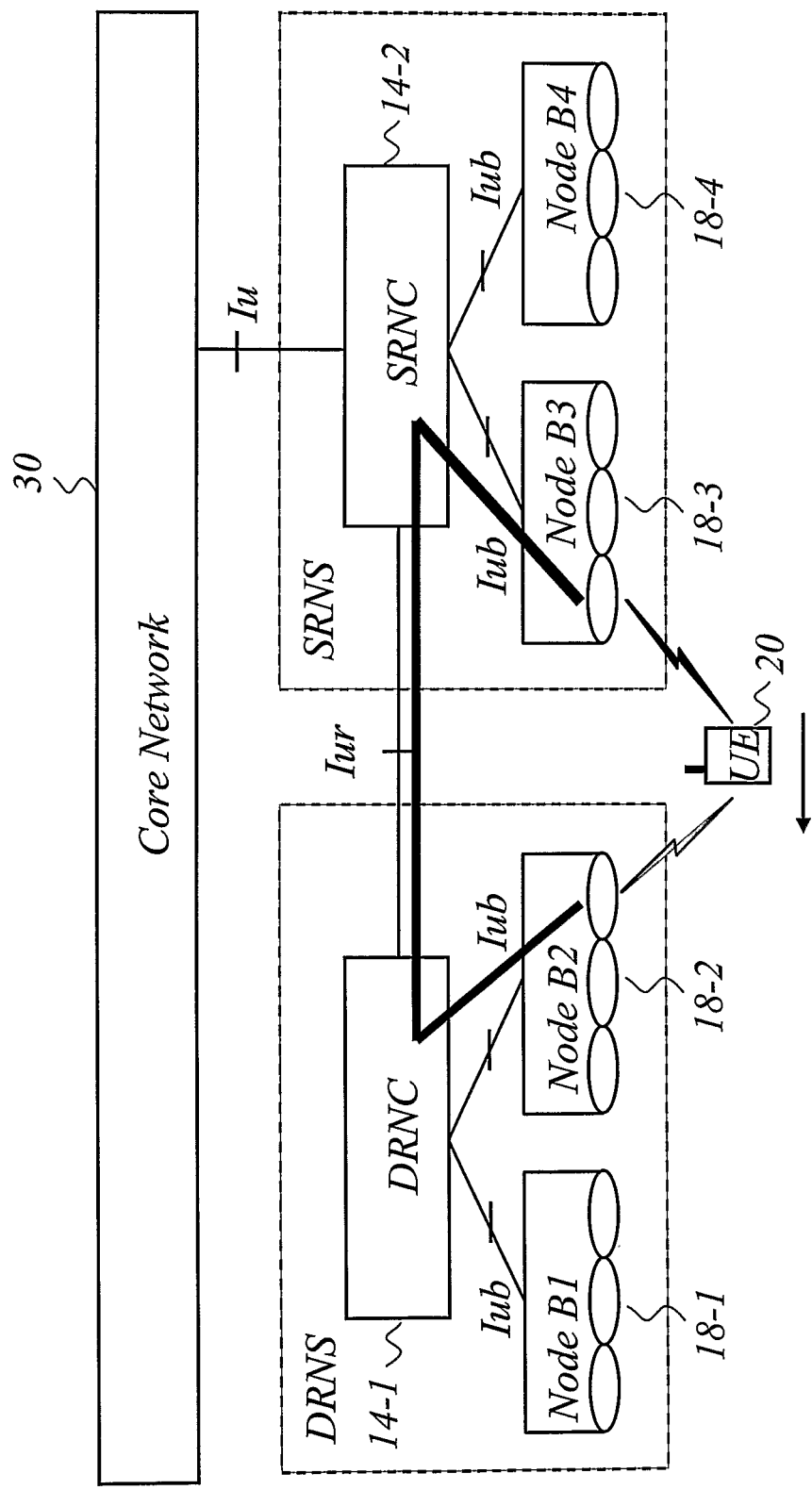
FIG. 6 is a schematic exemplary block diagram illustrating the different nodes involved when adding a radio link, for the exemplary case of inter RNC handover.

FIG. 6 is a schematic block diagram illustrating the different nodes involved when adding a radio link, for the exemplary case of inter RNC handover. Those familiar with UMTS Radio Access Network (UTRAN) and W-CDMA will recognize that the schematics of FIG. 6 correspond to the basic UTRAN architecture having a core network 30, a drift radio network subsystem with a drift RNC (DRNC) 14-1 and associated Node Bs 18-1 and 18-2, and a serving radio network subsystem with a serving RNC (SRNC) 14-2 and associated Node Bs 18-3 and 18-4. In this example, the UE 20 has a radio link with Node B3 18-3 and as the UE moves in the cellular architecture, the system reaction is to add a radio link with Node B2 18-2. In general, for each mobile or UE, one RNC is responsible—the serving RNC (SRNC), and if the UE moves to a cell controlled by a different RNC, that RNC becomes the drift RNC (DRNC), although the main control stays with the SRNC. Naturally, the SRNC may relocate control to DRNC and then the former DRNC becomes the new SRNC.

When the system should perform a handover (HO), the relevant radio network controller (RNC) will issue "Radio Link Setup Request" to the considered Node B (base station in WCDMA terminology) [2]. This message contains information on how the new radio link should be configured in the Node B.

Preferably, the system reaction to Active Set Update events (i.e. the addition "Add" of a new RBS to the UE's current Active Set) is modified. The state-of-the art solution simply consists in adding, to the Active Set, the cell that corresponds to the P-CPICH whose measure triggered the Handover command. In case this target cell is equipped with narrow Fixed Beams (narrow multi-beams), the new link is established with the cell-wide beam that carries P-CPICH. Only upon completion of the Soft Handover procedure, the RNC is able to initiate the Physical Channel Reconfiguration signaling procedure that leads to the allocation of the proper narrow beam (as detected based on measurements on the new radio uplink).

The prior art solution requires that the addition of the proper beam is always completed after:

1. completion of the soft handover procedure towards the new cell (wide beam); and
2. completion of the subsequent beam-switch procedure on the target cell.

In the following, the above two-step procedure will be referred to as "wide beam handover".

Due to limitations in the 3GPP standard where the RNC can not order the RBS to perform a measurement on the uplink of a specific UE before handover completion, the proper target narrow beam in the target cell cannot be measured or determined in advance. The estimation and establishment of narrow beam information is therefore an important part of the proposed procedure to enable selection of a suitable narrow target beam before the new radio link is set-up.

Figure 7:
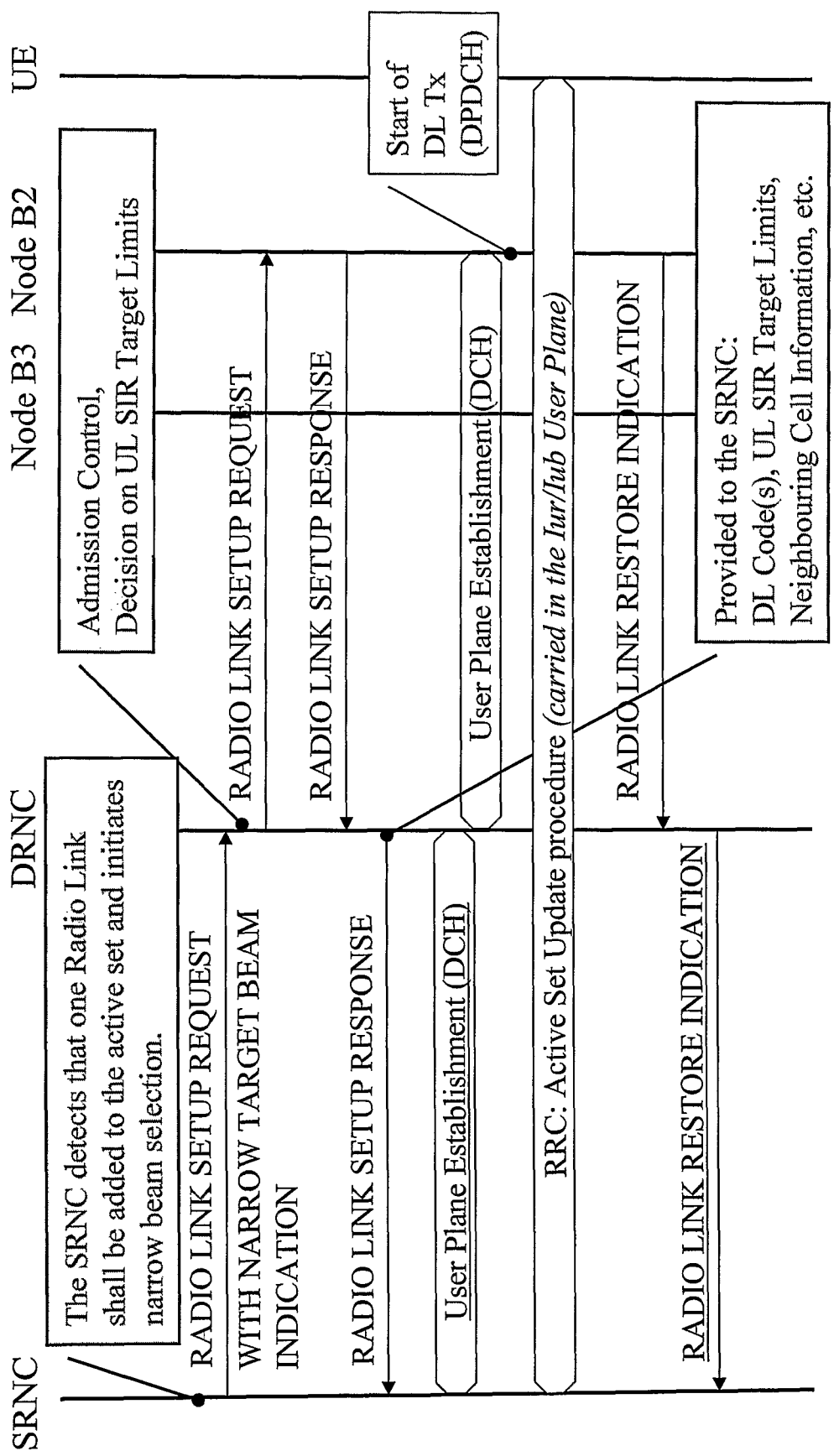
FIGS. 7-8 are schematic signal and sequence diagrams illustrating a handover procedure indicating narrow beam selection at handover request/initiation.
Figure 8:
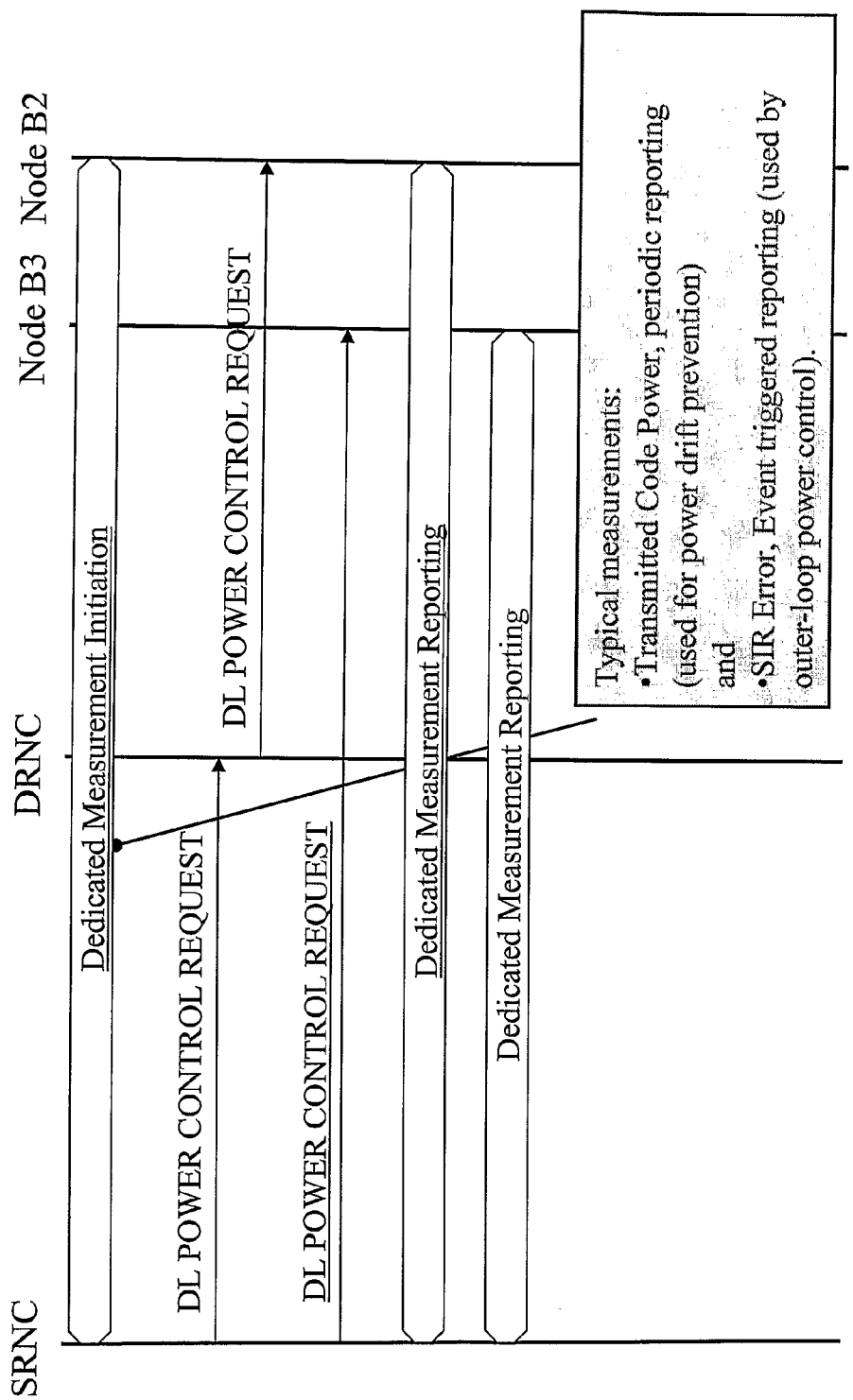

An exemplary novel procedure referred to as "narrow beam handover", proposed as a part of the present invention, includes selection of a target beam within the target cell directly at (soft) handover initiation, as indicated in the signal and sequence diagrams of FIGS. 7-8.

With reference to FIGS. 7-8, the SNRC detects that a radio link should be added to the active set, and initiates narrow beam selection according to the invention. This normally means that the SRNC or equivalent physical or logical network unit consults a table, database or similar information structure holding pre-estimated information on narrow beams in the system. Preferably, the information on narrow beams in the system is established at system deployment, and optionally updated at deployment changes and/or based on run-time experiences. The SNRC sends a so-called RADIO LINK SETUP REQUEST to the DRNC, including an indication of a selected narrow target beam. The DRNC basically performs admission control to see if there are any available radio resources. If the requested resources are available, the DRNC forwards the RADIO LINK SETUP REQUEST to the relevant node B (node B2 in this example) and also decides on a set of control parameters such as uplink (UL) SIR target limits. Node B2 then allocates the requested resources, allocating a radio link directly with the selected narrow target beam, and reports successful radio resource allocation in a RADIO LINK SETUP RESPONSE to the DRNC. The Node B starts uplink (UL) reception. The DRNC sends a RADIO LINK SETUP RESPONSE back to the SRNC. Among other things, the SRNC then initiates user plane establishment, which normally involves setup of an Iur/Iub or equivalent data transport bearer and binding to the Dedicated Channel (DCH). Then Node B starts downlink (DL) transmission. The Radio Resource Control (RRC) Active Set Update procedure is then initiated, normally meaning that the SRNC sends an Active Set Update message to the UE and the UE acknowledges with an Active Set Update Complete message. When Node B achieves uplink synchronization on the Uu interface, it may notify the DRNC with a RADIO LINK RESTORE INDICATION message. The DRNC may in turn notify the SRNC.

According to the standards, the Radio Resource Control (RRC) functionality also controls the items to be measured in the radio interface including the measurement period, timing and reporting method by the UE. Measurement Initiation is a conventional procedure for setting measurement functions of the UE, and Measurement Reporting is a conventional procedure for the UE to forward measurement results to the network. The RRC also handles power control, and the downlink power control procedure (including sending downlink (DL) power control requests to the relevant node Bs) can be initiated by the SRNC any time after establishment of a radio link.

As previously mentioned, a table or equivalent information structure may be used on the network side, e.g. in the SRNC, to store the best estimate(s) known at each time and to be used for lookup of best beam transmission when allocating the radio link. This means that the new serving radio link can be established directly with the selected target beam. In other words, the proposed "narrow beam handover" solution means that the addition of the proper beam is completed after completion of the handover procedure towards the new cell and narrow beam. This is in clear contrast to the prior art, where the radio link first has to be established with a cell-wide beam and then, after uplink measurements, reconfigured onto a narrow beam.

In case of correct estimation of the target narrow beam, the advantages of the proposed new procedure include:
  Reduced delay of the addition of the new narrow beam link (no two-phase procedure).
  Reduced interference on the target cell wide beam (which is an important limiting factor for the capacity enhancement provided by Fixed Beam antenna solutions).

Only in case of incorrect estimation, the proper beam may have to be added after completion of the beam-switch procedure to the proper narrow beam, now detectable on the uplink. This is merely a fall-back if the estimation of narrow beam fails.

In case of wrong estimation, the downlink signal will be carried to the UE by a misdirected narrow beam (there is no consequence on the uplink), until a beam switch-procedure is completed. During this phase, the link could require more power (with respect to the wide beam handover), but will still only create interference in the limited area covered by the wrongly assigned narrow beam. The probability of loss of the connection in the downlink is also expected to increase, however very limited increase with expected behavior going towards zero probability.

If the communication quality of the new radio link with the narrow target beam is deemed to be insufficient the radio link may thus be re-configured onto the corresponding cell-wide beam or another more suitable narrow target beam.

It may be beneficial to fall back to the wide beam handover procedure when better-than-random estimations are not available.

Example of Build-Up and Usage of a Narrow Beam Handover Facilitating Table

For example, the handover measurements and signaling in WCDMA is based on the Primary Common PIlot CHannel, P-CPICH. This reference signal transmitted in every cell in the system can be viewed as the signal that defines the cell coverage in a WCDMA system. Since this signal needs to be the same in the whole cell, certain problems arise when several narrow beams are used to cover a cell, e.g. when beam-forming is applied in the system. For the downlink coherent detection schemes a phase reference is required that has experienced the same propagation channel as the transmitted payload transmission. For this reason WCDMA supports Secondary Common Pilot Channels, S-CPICHs, where each of these reference signals can be associated to a narrow beam (cell portion in the 3GPP nomenclature) transmission. If dedicated transmission is assigned to a UE via a narrow beam (cell portion) #n, the radio link is associated as well at RNC level to a specific S-CPICH #N.

Further, the handover mechanism is conventionally based solely on quality measurements on the P-CPICH. The UE is constantly measuring the quality of the pilot from neighboring cells, and this is reported to the radio network controller (RNC). The RNC is communicating to the UEs information on which neighbors to monitor via a limited size neighbor list.

From the P-CPICH measurements reported for the neighbor list, the RNC or similar network unit may decide to add a link from a certain cell to the active set if certain requirements are fulfilled, e.g. the quality of the pilot signal is above a certain threshold. Also the opposite, when the quality of a pilot signal drop below a certain limit, this radio link is dropped. In this way, the UE can maintain a radio connection when it travels through the cellular layout of a system.

Based on the current active cell set, the RNC may thus select a target cell from the P-CPICH measurements reported for the neighbor list. The RNC can then select a suitable narrow target beam within that target cell based on pre-established narrow beam information, e.g. obtained from system deployment measurements. Alternatively, the RNC can jointly select target cell and target beam based on information on the active cell set, for example by performing a (more or less exhaustive) search among the narrow beams within the neighbor cells to find a suitable (high-performance) narrow target beam.

Figure 9:
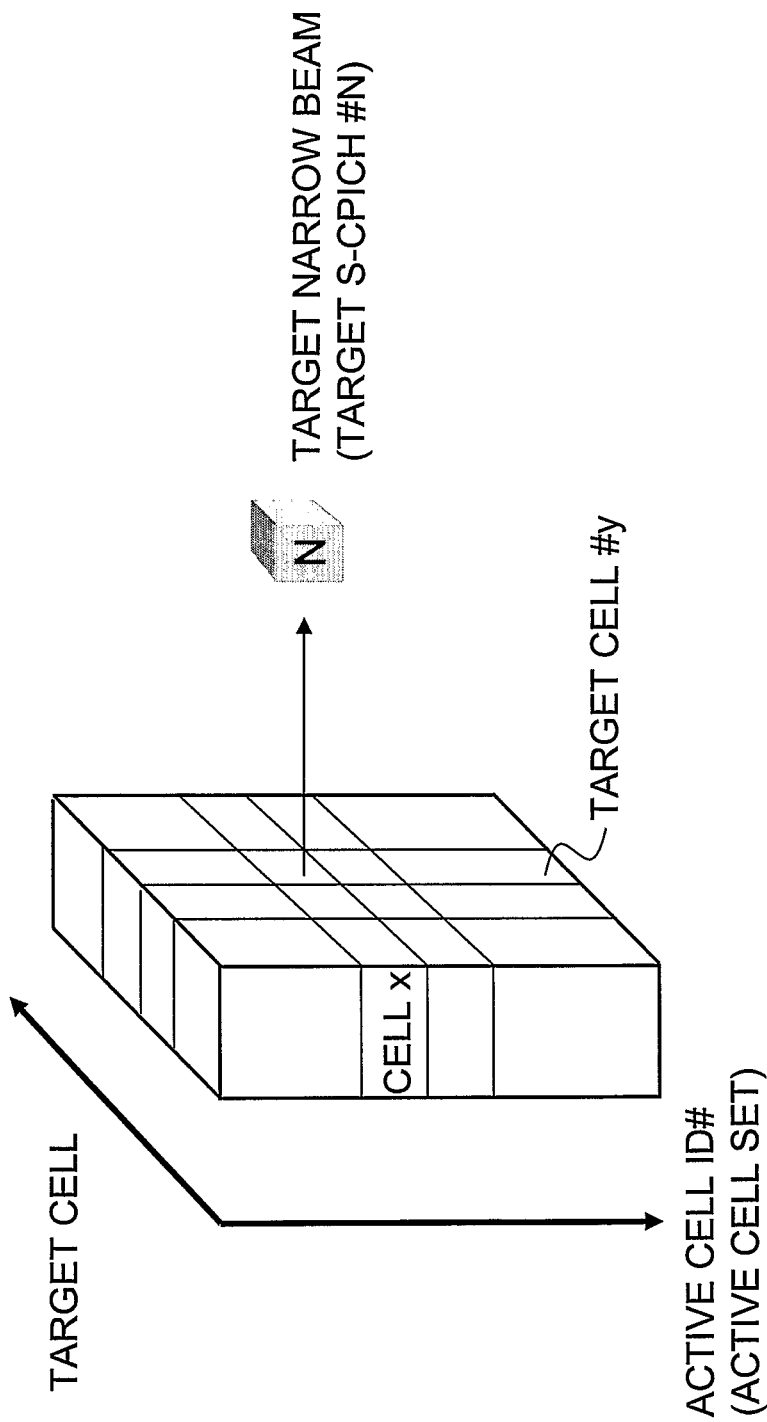
FIG. 9 is a schematic diagram of an information structure such as a table or database holding structured information on narrow beams within a cellular radio communication system according to an exemplary embodiment of the invention.

FIG. 9 is a schematic diagram of an information structure such as a table or database holding structured information on narrow beams within a cellular radio communication system according to an exemplary embodiment of the invention. It can be seen that information on the active cell set and the target cell provide information on a suitable target narrow beam. By way of example, assume that the active cell set is currently defined by cell #x, and that measurements on neighbor cells give at hand that neighbor cell #y has the best quality and is selected as target cell. The table or database of FIG. 9 is structured for associating each relevant combination of active cell set and target cell with a narrow beam to enable identification of a narrow target beam in response to information of active cell set and target cell. In this particular example, the combination of active cell #x and target cell #y can thus be used as input to the table to find information on target S-CPICH #N, which is mapped to a given cell portion corresponding to a narrow target beam.

In another exemplary embodiment of the invention, the build-up of a best estimate handover facilitating table in the RNC use the knowledge based on the following input for HO from each cell:
1. Target cell for HO based on P-CPICH measurements (i.e. the selected neighbor cell from the neighbor list monitoring).
2. The active cell (narrow) beam usage (i.e. the S-CPICH or P-CPICH in use)

Figure 10:
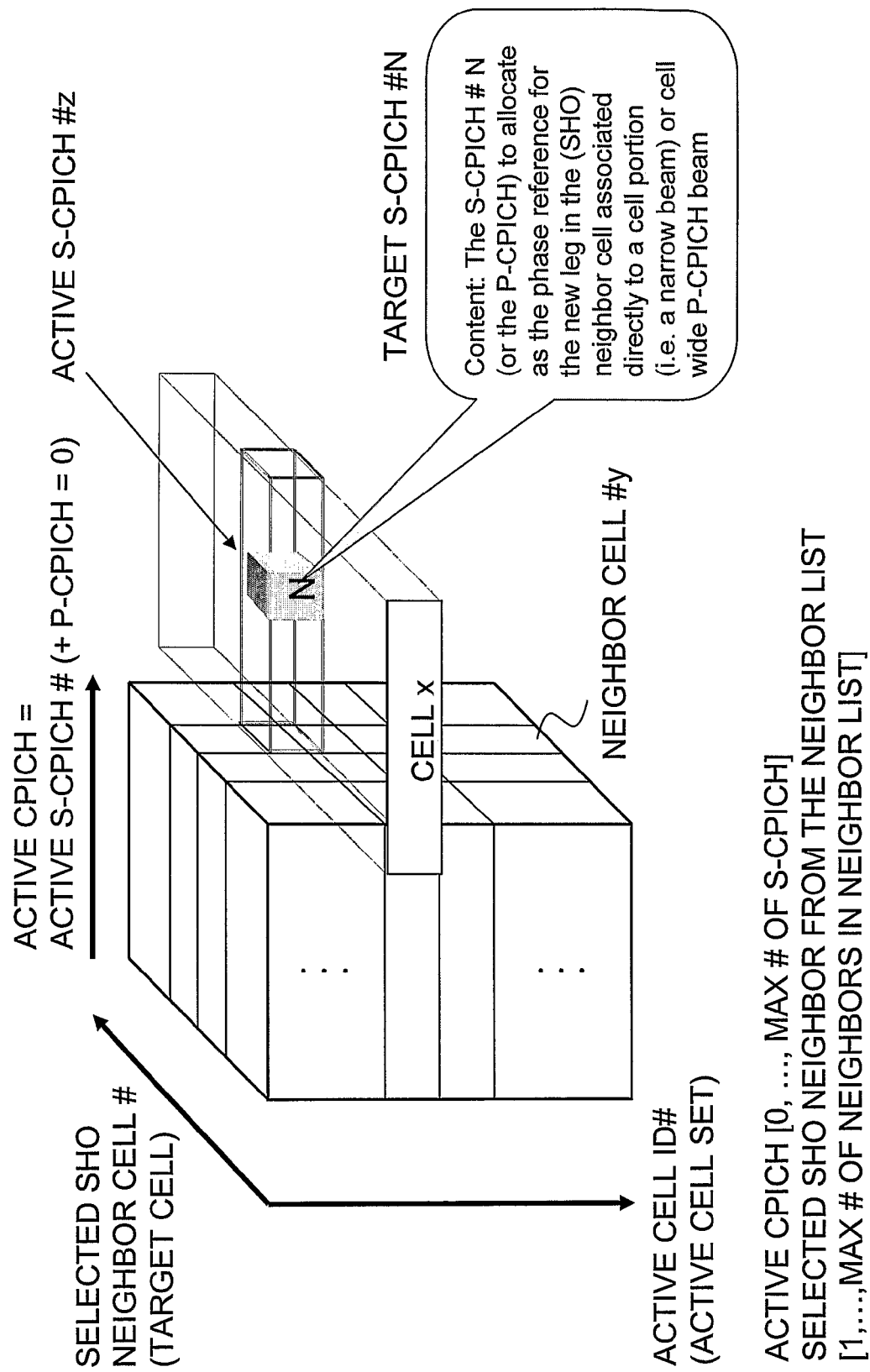
FIG. 10 is a schematic diagram of an information structure such as a table or equivalent database holding structured information on narrow beams within a cellular radio communication system according to another exemplary embodiment of the invention.

FIG. 10 is a schematic diagram of an information structure such as a table or equivalent database holding structured information on narrow beams within a cellular radio communication system according to another exemplary embodiment of the invention. The table or database is primarily intended for usage at handover from a narrow beam towards another narrow beam in a neighbor cell. The table facilitates narrow beam handover. The example shows the situation when a handover is performed from active cell #x with existing radio link in a narrow beam (or equivalent using phase reference S-CPICH) #z towards a new cell in neighbor list element #y (i.e. target cell #y) where the estimate is to use narrow beam (or the phase reference S-CPICH) #N. In other words, the database or table can be regarded as a chest of drawers where a certain drawer (corresponding to the active cell #x) is pulled out for further investigation. In that drawer, a certain compartment (corresponding to the selected neighbor cell #y) is then selected and a particular box (corresponding to the active S-CPICH #z in the active cell #x) within that compartment is finally opened to find the target S-CPICH corresponding to the narrow target beam #N in the selected target cell #y.

Example of Narrow Beam HO Table Build-Up Based on Estimation of Radio Centric Environment at System Deployment As a baseline at system deployment, the radio centric environment can normally be measured for identifying all entities in the table. That is, the different beams of the system are identified, and a table of this environment is built to create a baseline estimation of best beam for the deployment. This can and should normally be repeated every time the deployment is upgraded, e.g. with new sites/cells and other changes of site parameters as well as power levels and other parameters.

Example of Updating Estimation by Adaptively Building the Narrow Beam Ho Table Based on Experiences During Runtime.

An optional updating method is also disclosed here based on adaptively building the table from experiences during runtime. The goal here is to maintain and update the table of neighboring beams, so that the management of handover can be gradually improved over time as well as responsive to changes.

It has been recognized that the correlation between cells and/or narrow beams for the current connection and proper beam in the target cell is high. In other words, it can be expected that UEs connected to a specific set of cells (or their respective narrow beams, when these cells are also equipped with Fixed Beams) are roughly located in a specific portion of the covered area, and will therefore move to a specific portion of the target cell, in turn corresponding (with high probability) to a specific target narrow beam.

In order to quantify the above relations, a database may be built including the number of occurrences of every specific completed beam handover event (executed according to the wide and/or narrow beam handover procedures).

When a handover is performed, the following inputs are provided to the estimation algorithm:
Current cells in Active Set.
If one or more of these cells are equipped with Fixed Beams antennas, narrow beams currently defined for the UE within the cell(s).
Target cell.

Obviously, in case the target cell is not equipped with Fixed Beams antennas, the normal handover procedure applies.

If the target cell is equipped with Fixed Beams antennas, the number of occurrences corresponding to the completed handovers to the narrow beam of the target cell may be checked in the database, for all cases where the "current active set" configuration was the same as in the examined case. Completed handover normally means a successful handover to a narrow beam, including direct narrow beam handover, handover to a narrow beam via first a wide beam and handover to a narrow beam via first an unsuccessful narrow beam handover.

When one of the target narrow beams is found with a significantly higher "success" probability (much more occurrences in the database), then that narrow beam is selected as target in the new cell.

If the probability associated with the different possible target narrow beams is roughly the same, then one alternative can be to select the wide beam as target for the handover. This has the aim of reducing the number of wrong narrow beam target selection that could lead to an unusable downlink connection.

The estimated performance of a narrow beam may thus be based on previous "success rate" of handover to the narrow beam under similar handover circumstances. In an exemplary embodiment, information on estimated performance for each narrow beam may then be maintained in a special database, and used for updating a more practical handover table that only contains the best estimates.

As mentioned above, the new updated estimation should preferably be used for updating the table only when it is significant. Possible factors to be evaluated when deciding whether the estimation is significant include:
Total number of occurrences present in the database for the specific combination of current and target cells (should be higher than an absolute threshold).

Absolute value of the probability associated with the target narrow beam (i.e. the ratio between the highest and the total number of occurrences).

Difference between the probability associated with the target narrow beam and the second narrow beam in the rank.

Number of narrow beams in the target cell.

Sum of the probability of the target narrow beam and its closest neighboring beams.[1]

[1] Especially with high number of narrow beams per cell, it might be beneficial to take into account the fact that choosing a wrong but neighboring narrow beam leads to better performance than choosing a "very" wrong narrow beam. In this case the downlink can probably be preserved for the time needed for a beam-switch, thus just leading (in case of error) to the same delay as in the wide beam handover.

This can/may be a base for a number of criteria when to update the handover facilitating table.

Figure 11:
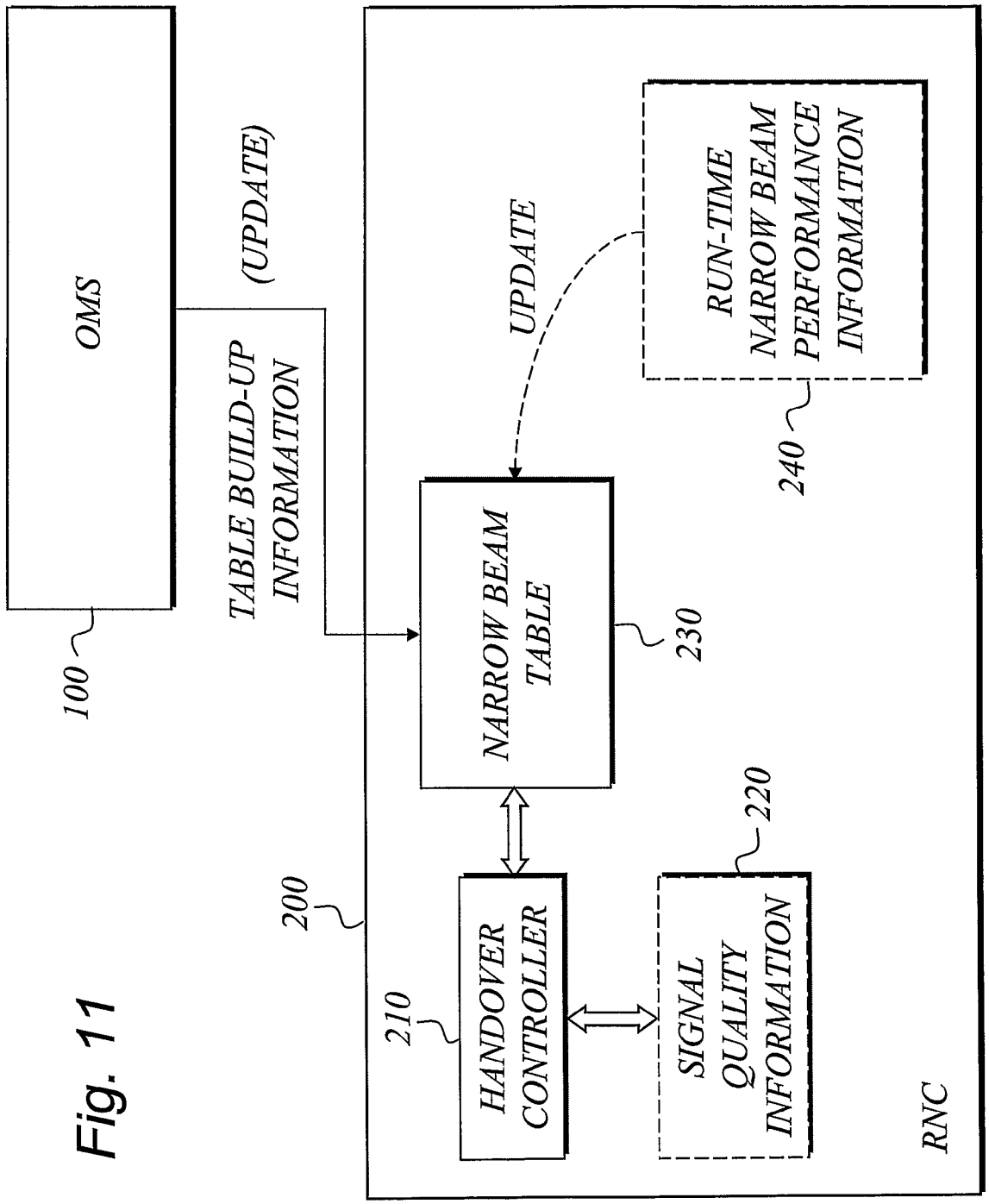
FIG. 11 is a schematic block diagram illustrating a radio network controller with an associated operation management system according to an exemplary embodiment of the invention.

FIG. 11 is a schematic block diagram illustrating a radio network controller with an associated operation management system according to an exemplary embodiment of the invention. In general radio network controllers (RNCs) include functionality for radio resource management such as handover control, power control, admission control and packet scheduling, code management and/or macro diversity management. The following description will mainly focus on those components and/or functions that are relevant to the present invention, namely handover. The radio network controller (RNC) includes a handover controller 210, a database 220 for signal quality information such as information based on P-CPICH measurements, a pre-estimated narrow beam table 230, and an alternative/optional database 240 with narrow beam performance operation obtained during run-time. The handover controller 210 detects the need for setting up a new radio link with another cell. The handover controller may then consult the database 220 for signal quality information related to those cells that are found in the neighbor list of the current active cell set to select a suitable target cell, and then consult the narrow beam table 230 to find a suitable narrow target beam of the selected target cell. Alternatively, the narrow beam table 230 is configured so that target cell and narrow target beam can be selected jointly based on the active cell set (and optionally also active cell portion) as input.

As previously explained, the narrow beam table 230 can be established at system deployment, for example by means of the operation and management system (OMS) 100, which provides the necessary information on the radio centric environment as input for building the narrow beam table 230. The table may of course be updated at deployment changes.

The RNC also comprises an optional database 240 that includes narrow beam performance information acquired during run-time. This database can also be used for updating the narrow beam table. Alternatively, the database 240 may in itself act as a narrow beam table, and the handover controller 210 may interface directly with the database 240 for selecting a suitable narrow target beam.

Naturally, a number of other variations and/or extensions exist as understood by those skilled in the art.

Briefly, it is an object of the present invention to facilitate the handover function (in WCDMA, and generally applicable in other systems as well) to allow for handover from/to narrow beam and narrow beam to narrow beam directly without the need to back off and transmit over the entire cell at handover. This will substantially improve the possibility to secure and achieve the system capacity/coverage gains promised by narrow beam (smart antennas/adaptive antennas/fixed beams) techniques.

The embodiments described above are merely given as examples, and it should be understood that the present invention is not limited thereto. Further modifications, changes and improvements which retain the basic underlying principles disclosed and claimed herein are within the scope of the invention.

References

[1] International Patent Application WO 2005/032200 A2, with international publication date Apr. 7, 2005.

[2] 3GPP standard specification, TS25.215 v5.7.0, Physical layer—Measurements (FDD).

The invention claimed is:

1. A method for supporting inter-cell handover in a cellular radio communication system having a plurality of cells with adaptive antennas for enabling narrow beam operation, wherein a mobile unit is served by an active cell set of at least one cell from said plurality of cells in said cellular communication system, wherein said method comprises the steps of:

prior to establishment of a new serving radio link in a neighbor cell of the current active cell set to facilitate said handover from the current active cell set, selecting a narrow target beam within the neighbor cell, wherein the narrow target beam is selected from a database containing pre-established information of all narrow beams within said neighbor cell;

initiating establishment of said new serving radio link directly with said selected narrow target beam without reconfiguration through a cell-wide beam in the neighbor cell; and wherein said step of selecting a narrow target beam prior to establishment of a new serving radio link for said mobile unit is performed directly at handover initiation based on said pre-established information.

2. The method of claim 1, wherein said step of selecting a narrow target beam within a neighbor area of the current active cell set comprises the steps of:

selecting a target cell in said neighbor area based on communication quality measurements; and selecting said narrow target beam within said target cell based on pre-established information of narrow beams within said target cell.

3. The method of claim 1, wherein said pre-established information comprises information on the radio centric environment including identification of narrow beams within said neighbor area and information on estimated performance of said narrow beams.

4. The method of claim 3, wherein said narrow target beam is selected among those narrow beams that have the highest estimated performance.

5. The method of claim 3, wherein the estimated performance of a narrow beam is at least partly based on previous success rate of handover to the narrow beam under similar handover circumstances.

6. The method of claim 3, wherein a representation of said pre-established information is stored in a table on the network side, and a table look-up is performed to find said narrow target beam, wherein said table is built based on measurements of the radio centric environment, including identification and estimation of narrow beams, at deployment of the cellular communication system.

7. The method of claim 1, wherein said step of selecting narrow target beam is performed at least partly based on information of current cell(s) in the active set.

8. The method of claim 1, wherein said step of selecting narrow target beam is performed based on information of selected target cell and current cell(s) in the active set.

9. The method of claim 1, wherein said step of selecting narrow target beam is performed based on information of selected target cell, current cell(s) in the active set and narrow beam(s) currently defined for the mobile unit within the current cell(s) in the active set.

10. The method of claim 1, further comprising the step of re-configuring, if the radio communication quality of said new radio link with the narrow target beam is deemed to be insufficient, said new radio link onto a corresponding cell-wide beam or another narrow target beam.

11. The method of claim 1, wherein said pre-established information of narrow beams is established at system deployment.

12. An arrangement for supporting inter-cell handover in a cellular radio communication system, said cellular communication system having a plurality of cells with adaptive antennas for enabling narrow beam operation, wherein a mobile unit is served by an active cell set of at least one cell from said plurality of cells in said cellular communication system, wherein said arrangement comprises:
    means for selecting, prior to establishment of a new serving radio link in a neighbor cell of the current active cell set to facilitate said handover from the current active cell set, a narrow target beam within the neighbor cell, wherein the narrow target beam is selected from a database containing pre-established information of narrow beams within said neighbor cell;
    means for initiating establishment of said new serving radio link directly with said selected narrow target beam without reconfiguration through a cell-wide beam in the neighbor cell; and
    wherein said selecting means is operable for selecting a narrow target beam directly at handover initiation based on said pre-established information.

13. The arrangement of claim 12, wherein said means for selecting a narrow target beam within a neighbor area of the current active cell set comprises:
    means for selecting a target cell in said neighbor area based on communication quality measurements; and
    means for selecting said narrow target beam within said target cell based on pre-established information of narrow beams within said target cell.

14. The arrangement of claim 12, wherein said pre-established information comprises information on the radio centric environment including identification of narrow beams within said neighbor area and information on estimated performance of said narrow beams.

15. The arrangement of claim 14, wherein said means for selecting a narrow target beam within a neighbor area of the current active cell set is operable for selecting said narrow target beam among those narrow beams that have the highest estimated performance.

16. The arrangement of claim 14, wherein the estimated performance of a narrow beam is at least partly based on previous success rate of handover to the narrow beam with the corresponding previous active cell set being the same as the current active cell set.

17. The arrangement of claim 12, further comprising means for storing a representation of said pre-established information in a table on the network side, and means for performing a table look-up to find said narrow target beam, wherein said table is built based on measurements of the radio centric environment, including identification and estimation of narrow beams, at deployment of the cellular communication system.

18. The arrangement of claim 12, further comprising means for re-configuring, if the radio communication quality of said new radio link with the narrow target beam is deemed to be insufficient, said new radio link onto a corresponding cell-wide beam or another narrow target beam.

19. The arrangement of claim 12, wherein said selecting means is operable for consulting an information structure holding said pre-established information of narrow beams, said information structure established at system deployment.

20. A network unit in a cellular radio communication system, said cellular communication system having a plurality of cells with adaptive antennas for enabling narrow beam operation, wherein said network unit comprises:
    an information structure for storing information of all narrow beams within said cellular communication system; and
    a handover controller operable for:
        consulting said information structure, prior to establishment of a new serving radio link in a neighbor cell of a current active cell set to facilitate said handover from the current active cell set, to find a suitable narrow target beam within the neighbor cell, wherein the narrow target beam is selected from the information structure; and
        initiating establishment of said new serving radio link directly with said selected narrow target beam without reconfiguration through a cell-wide beam in the neighbor cell; and
        wherein said handover controller is operable for consulting said information structure to find a narrow target beam directly at handover initiation.

21. The network unit of claim 20, wherein said handover controller is further operable for:
    selecting a target cell in said neighbor area based on communication quality measurements; and
    selecting said narrow target beam within said target cell based on pre-established information, in said information structure, of narrow beams within said target cell.

22. The network unit of claim 20, wherein said information structure includes a table built based on measurements of the radio centric environment, including identification and estimation of narrow beams, at deployment of the cellular communication system.

23. The network unit of claim 22, wherein said table is updated at deployment changes.

24. The network unit of claim 22, wherein said table is updated based on handover experiences during run-time.

25. The network unit of claim 24, wherein said network unit further comprises:
    means for collecting information on estimated handover performance of identified narrow beams within said cellular communication system during run-time;
    means for updating said table based on the collected information.

26. The network unit of claim 25, wherein the estimated performance of a narrow beam corresponds to previous success rate of handover to the narrow beam with the corresponding previous active cell set being the same as the current active cell set.

27. The network unit of claim 20, wherein said information structure is structured for associating each relevant combination of active cell set and target cell with a narrow beam to enable identification of a narrow target beam in response to information of active cell set and target cell.

28. The network unit of claim 20, wherein said information structure is structured for associating each relevant combination of active cell set, active narrow beam(s) within the active set and target cell with a narrow beam to enable identification of a narrow target beam in response to information of active cell set, active narrow beam(s) within the active set and target cell.

29. The network unit of claim 20, wherein said network unit is one of a radio network controller, a mobility server and an access gateway.

* * * * *